Dec. 22, 1964  J. W. SCHULZ, JR  3,162,153
CORN PLANTER
Filed April 24, 1963  2 Sheets-Sheet 1
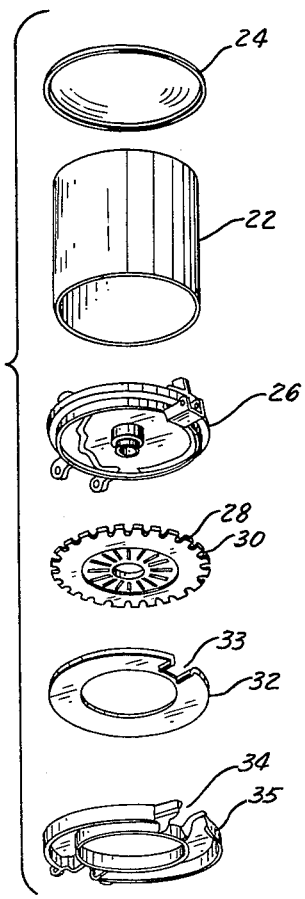
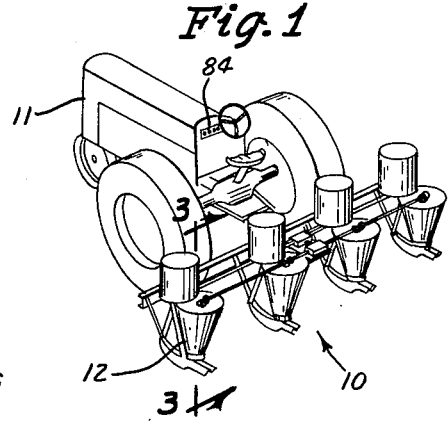
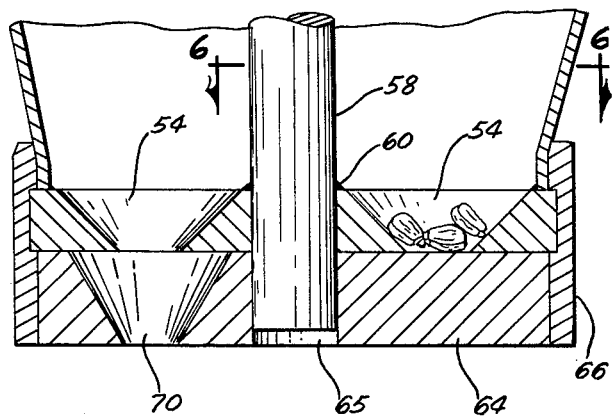
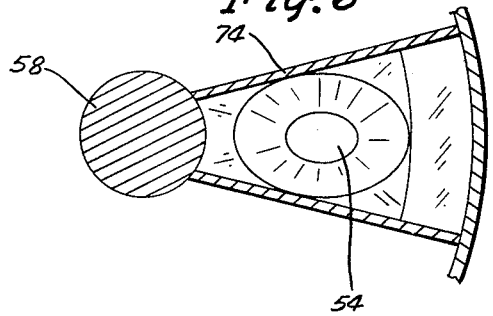
INVENTOR
JOHN W. SCHULZ, JR.
BY
Dick, Zarley + Henderson
ATTORNEYS

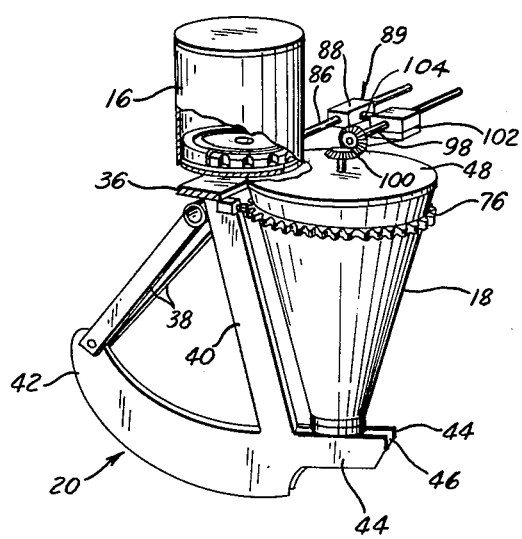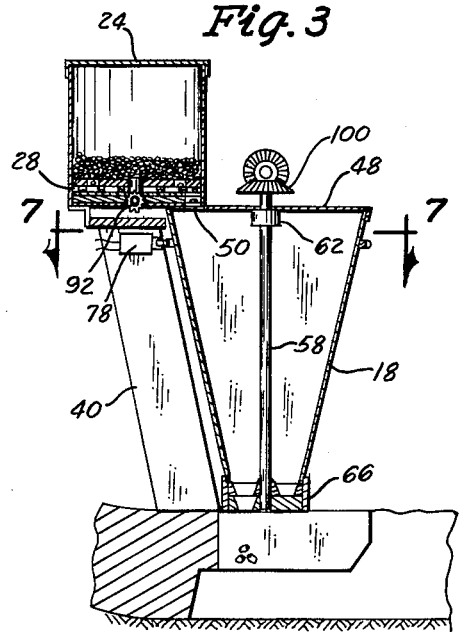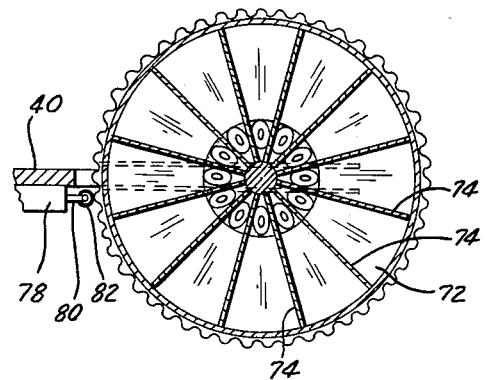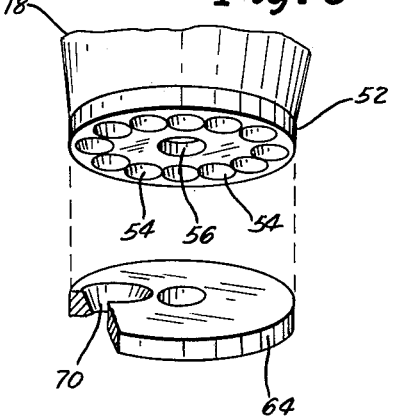

3,162,153
CORN PLANTER
John W. Schulz, Jr., Irvington, Iowa
Filed Apr. 24, 1963, Ser. No. 275,426
11 Claims. (Cl. 111—51)

This invention relates to a corn planter and in particular to the seed storing and dropping assembly.

Farm machinery mounted on the tractor may generally be operated at higher forward speeds than when pulled behind the tractor. However, conventional corn planters, having very complex and rapidly moving parts, are limited to the slower speeds. The seed dropping mechanism in the boot of the planter is especially intricate and has a relatively low top speed of operation if best results are desired.

Therefore, it is an object of this invention to provide a corn planter having a seed dropping mechanism that is capable of operating at high speeds.

It is a further object of this invention to provide a revolving hopper having a plurality of seed storing chambers.

It is a further object of this invention to provide a corn planter having a first hopper which is capable of discharging seed into a second hopper at a desired predetermined rate; and from the second hopper into a planter shoe.

It is a further object of this invention to provide an electrical signaling system to indicate that the seed dropping mechanism is operating properly.

It is a further object of this invention to use in combination a conventional planter box hopper for feeding into a revolving hopper.

It is a further object of this invention to provide a seed storage and dropping mechanism that is economical to manufacture, durable in use and effective for its intended purpose.

Various other objects and advantages will appear from the following description of one embodiment of this invention, and the novel features will be particularly pointed out hereinafter in connection with the appended claims and illustrated in the accompanying drawings in which:

FIG. 1 is a perspective view of a corn planter mounted on a tractor employing four seed storing and dropping assemblies;

FIG. 2 is a side perspective view of one of the seed storing and dropping assemblies illustrated in FIG. 1 with a portion of the top hopper cut away to more clearly illustrate its construction;

FIG. 3 is an elevation cross sectional view of the seed storing and dropping assembly of FIG. 1 taken along line 3—3;

FIG. 4 is an exploded view of the top seed hopper in the seed storing and dropping assembly;

FIG. 5 is a fragmentary cross sectional view in elevation of only the lower hopper in the seed storing and dropping assembly;

FIG. 6 is a cross sectional view taken along line 6—6 in FIG. 5 showing one of the chambers provided in the lower seed hopper of the seed storing and dropping assembly;

FIG. 7 is a cross sectional view taken along line 7—7 in FIG. 3 showing the chambers in the lower hopper and the circumferential undulated rim thereon in engagement with a plunger carried by a micro switch.

FIG. 8 is a fragmentary perspective view showing the base of the lower hopper in an exploded relationship to its base bearing plate.

Referring to FIG. 1 a corn planter generally indicated at 10 is mounted on a tractor 11 and is provided with four seed storing and dropping assemblies 12.

The seed storing and dropping assembly 12 is shown in FIG. 2 as comprising generally a conventional seed hopper 16 mounted on top of a funnel shaped hopper 18 which is carried by a planter shoe 20.

In FIG. 4 the conventional seed hopper 16 is illustrated as comprising a hopper member 22 having a cover 24 on one end and a hopper bottom 26 on the other end. A seed plate 28 having twenty-four cells 30 formed uniformly about its periphery is adapted to rotate in mating engagement between the hopper bottom 26 and a filler ring 32. The filler ring 32 is provided with an opening 33 which is aligned with an opening 34 in a hopper bottom plate 35 positioned on the other side of the filler ring 32.

The planter shoe (FIG. 2) includes a pair of braces 38 and a leg member 40 which converge at one end along a common line and are secured at their other end to a runner 42 and heel plates 44 respectively. The heel plates 44 are separated by an opening 46.

The funnel shaped hopper 18 (FIG. 3) is provided at its upper end with a coverbearing plate 48 having an opening 50 near its peripheral edge. At the smaller end of the funnel hopper 18 is affixed a bottom seed plate 52 (FIG. 8) having twelve equally spaced holes 54 concentrically formed about a center opening 56. A shaft 58 (FIG. 5) extends through the center opening 56 and is secured thereto by weld 60. The shaft 58 at its other end extends through the hopper cover 48 and is secured thereto by a bearing 62 (FIG. 3) affixed to the inside face of the cover 48.

A base bearing plate 64 (FIGS. 5 and 8) having a center opening 65 is embraced by a bearing sleeve 66 which has an annular recess 68 formed in its inside side wall to receive in mating engagement the bottom seed plate 52. The lower end of the shaft 58 is rotatably mounted in the center opening 65 in the plate 64. As the funnel hopper 18 is rotated the openings 54 in plate 52 will successively register with an opening 70 formed in the bearing plate 64. It is to be understood that opening 70 is uniformly tapered inwardly, however openings 54 (FIG. 6) are elliptical in shape and are tapered inwardly.

The inside of the funnel hopper 18 is uniformly divided into twelve chambers or compartments 72 (FIGS. 6 and 7) by the spaced thin walls 74 which extend the length of the funnel. Each of the twelve openings 54 in the bottom plate 52 communicate with one of the twelve chambers.

Adjacent the cover 48 is provided an undulated rim 76 (FIGS. 2 and 7) extending around the outside wall of the funnel 18. A micro switch 78 is secured to the leg member 40 opposite the rim 76. A plunger 80 carrying a roller 82 slidably extends from the switch 78. The roller 82 is positioned to ride over the undulations in the rim 76 thereby opening and closing the switch 78 which operates an indicator light 84 on the dash board of the tractor 11. An indicating light 84 is provided for each assembly 12.

In assemblying the hoppers 16 and 18 on the shoe 20, the opening 50 in cover 48 is aligned with the aligned openings 34, 33 in the hopper 16. The cover 48 is positioned such that the opening 50 is at least one chamber width counter clockwise (FIG. 7) of the opening 70 in plate 64 which is in alignment with the opening 46 between the heel plates 44 of the shoe 20. As will be hereinafter described in detail, the hopper 18 will ordinarily revolve counter clockwise as seen in FIG. 7.

Rotative power is supplied to seed plate 28 in hopper 16 by a drive shaft 86 (FIG. 2) coupled to a transmission 88 having a gear shift 89. Power is supplied to the transmission 88 in a suitable manner by a ground engaging wheel (not shown). A gear 92 is mounted on the end of shaft 86 and is in driving engagement with the seed plate 28 (FIG. 3).

The hopper 18 is rotated by a shaft 98 coupled to the shaft 58 by beveled spur gears 100 (FIG. 3). The other end of shaft 98 is connected to a clutch 102 which is in turn driven by a shaft 104 coupled to the transmission 88.

Thus it is seen that in operation, the seed plate 28 in hopper 16 will supply seed to the chambers 72 in the hopper 18 which will in turn rotate counter clockwise until their openings 54 are aligned with the planter heel opening 46 as shown in FIG. 3 at which time the seed will be dropped into the ground.

The number of kernels of corn or the like planted is a function of the speed of rotation of the seed plate 28 in hopper 16, the speed of rotation of the funnel hopper 18, and the number of cells 30 in the seed plate 28. Interchangeable plates 28 may be used having more or less of the cells 30 than illustrated in the drawings as long as the number of chambers 72 in the hopper 18 when divided into the number of cells 30 results in a whole number such as 1, 2, 3 or 4. As illustrated in the drawings one satisfactory ratio is 1:2 or twelve chambers 72 to 24 cells 30. The ratio between the speed of the hopper 18 to the speed of the cell plate 28 is selected in a similar manner. The ratio between number of revolutions per unit time of one to the number of revolutions per unit of time for the other should consist of whole numbers. For example, using a 24 cell plate 28 (one kernel of corn per cell) and a twelve chamber hopper 18 at a 1:1 speed ratio, two kernels of corn will be dropped into each chamber 72. To provide three kernels of corn a ratio of 3:2 would be used and if four kernels were desired, a ratio of 2:1 would apply. This may be explained by the fact that since there are twice as many cells as chambers each chamber will see two cells multiplied by the appropriate speed ratio factor. Where the speed ratio is 2:1 the speed ratio factor would be two and when multiplied by two cells each carrying one kernel of corn, it is seen that four kernels would be received by each chamber 72 as would each hill of corn. By the appropriate selection and use of the transmission 88, the seed plate 28 and the hopper 18 may be operated at any desired speed ratio. Although the transmission 88 should be provided with a neutral position an additional safety feature is provided in the clutch 102 controlling the revolving hopper 18. Corn or the like will not be accidentally discharged from the planter shoe 20 unless the clutch 102 is in its engaged position.

Some changes may be made in the construction and arrangement of my corn planter without departing from the real spirit and purpose of my invention, and it is my intention to cover by my claims, any modified forms of structure or use of mechanical equivalents which may be reasonably included within their scope.

I claim:

1. In a corn planter, comprising,
   a frame;
   a planter shoe carried by said frame, said shoe having an opening extending vertically therethrough;
   a funnel shaped hopper having a plurality of uniformly spaced longitudinally extending walls to form a plurality of chambers, said hopper having a base plate at its lower outlet end with a plurality of openings formed therein, each of said chambers being in communication with a separate one of said plurality of openings, said hopper being rotatably mounted on said shoe and each of said openings adapted to register successively with said opening in said shoe as said hopper is rotated;
   and means in engagement with said hopper to provide for its rotation.

2. The structure of claim 1 and an electrical circuit having a signalling means, an energy source and a switch mechanically connected to said hopper and operated by said hopper's rotation.

3. The structure of claim 1 and an electrical signalling circuit having an energy source, a signalling means and a switch having a plunger; said hopper being provided with an undulated circumferential rim and said plunger engaging said rim.

4. In a corn planter, comprising,
   a frame;
   a planter shoe carried by said frame, said shoe having an opening extending vertically therethrough;
   a funnel shaped hopper having a plurality of uniformly spaced longitudinally extending walls to form a plurality of chambers, said hopper having a base plate at its lower outlet end with a plurality of openings formed therein, each of said chambers being in communication with a separate one of said plurality of openings, a base plate bearing affixed to said shoe and having an opening formed therethrough in communication with said opening in said shoe, said hopper being rotatably mounted on said base plate bearing and each of said openings adapted to register successively with said openings in said base plate bearing and shoe as said hopper is rotated,
   and means in engagement with said hopper to provide for its rotation.

5. In a corn planter, comprising,
   a frame;
   a planter shoe carried by said frame, said shoe having an opening extending vertically therethrough;
   a funnel shaped hopper having a plurality of uniformly spaced longitudinally extending walls to form a plurality of chambers, said hopper having a base plate at its lower outlet end with a plurality of openings formed therein, each of said chambers being in communication with a separate one of said plurality of openings, said hopper being rotatably mounted on said shoe and each of said openings adapted to register successively with said opening in said shoe as said hopper is rotated;
   and a second hopper mounted on said frame and in communication with said first mentioned hopper and means in said second hopper for regulating the discharge of grain into said first hopper.

6. In a corn planter, comprising,
   a frame;
   a planter shoe carried by said frame, said shoe having an opening extending vertically therethrough;
   a funnel shaped hopper having a plurality of uniformly spaced longitudinally extending walls to form a plurality of chambers, said hopper having a base plate at its lower outlet end with a plurality of openings formed therein, each of said chambers being in communication with a separate one of said plurality of openings, said hopper being rotatably mounted on said shoe and each of said openings adapted to register successively with said opening in said shoe as said hopper is rotated;
   and a second hopper mounted above and having an opening in communication with said first hopper, said second hopper being provided at its bottom with a rotatable seed cell plate, said cells being in communication with said opening in said second hopper as said cell plate is rotated, and means for rotating said seed cell plate.

7. In a corn planter, comprising,
   a frame;
   a planter shoe carried by said frame, said shoe having an opening extending vertically therethrough;
   a funnel shaped first hopper having a plurality of uniformly spaced longitudinally extending walls to form a plurality of chambers, said hopper having a base plate at its lower outlet end with a plurality of openings formed therein, each of said chambers being in communication with a separate one of said plurality of openings, said hopper being rotatably mounted on said shoe and each of said openings adapted to register successively with said opening in said shoe as said hopper is rotated;

a second hopper mounted above and having an opening in communication with the inlet upper end of said first hopper, said second hopper being provided at its bottom with a rotatable seed cell plate, said cells being in communication with said opening in said second hopper as said cell plate is rotated, and means for rotating said seed cell plate; and the speed of rotation of said seed cell plate and said first hopper being synchronized to provide the desired number of seeds in said chambers and consequently the number of seeds to be dropped into the ground through said opening in said shoe.

8. In a corn planter, comprising, a frame;

a planter shoe carried by said frame, said shoe having an opening extending vertically therethrough;

a hopper having a plurality of uniformly spaced longitudinally extending walls to form a plurality of chambers, said hopper having a base plate at its lower outlet end with a plurality of openings formed therein, each of said chambers being in communication with a separate one of said plurality of openings, said hopper being rotatably mounted on said shoe and each of said openings adapted to register successively with said opening in said shoe as said hopper is rotated;

and means in engagement with said hopper to provide for its rotation.

9. In a corn planter, comprising, a frame;

a planter shoe carried by said frame, said shoe having an opening extending vertically therethrough;

a funnel shaped hopper having a plurality of uniformly spaced longitudinally extending walls to form a plurality of chambers, said hopper having a base plate at its lower outlet end with a plurality of openings formed therein, each of said chambers being in communication with a separate one of said plurality of openings, said hopper being rotatably mounted on said shoe and each of said openings adapted to register successively with said opening in said shoe as said hopper is rotated;

and means in engagement with said hopper to provide for its rotation, each of said openings in said base plate are downwardly tapering and conical in cross-section and the area of the upper end of said openings is substantially co-extensive with the area of the lower end of the respective chambers.

10. In a corn planter, comprising, a frame;

a planter shoe carried by said frame, said shoe having an opening extending vertically therethrough;

a funnel shaped hopper having a plurality of uniformly spaced longitudinally extending walls to form a plurality of chambers, said hopper having a base plate at its lower outlet end with a plurality of openings formed therein, each of said chambers being in communication with a separate one of said plurality of openings, said hopper being rotatably mounted on said shoe and each of said openings adapted to register successively with said opening in said shoe as said hopper is rotated;

and means in engagement with said hopper to provide for its rotation, a second hopper in communication with the inlet upper end of said funnel shaped hopper , means for dispensing a predetermined number of grains of seed into each chamber of said funnel shaped hopper as said funnel shaped hopper is rotated.

11. The structure of claim 10 wherein said funnel shaped hopper includes at least three chambers.

References Cited by the Examiner
UNITED STATES PATENTS

| | | | |
|---|---|---|---|
| 876,627 | 1/08 | Ennis | 111—34 |
| 930,831 | 8/09 | Brinkoeter | 111—77 |
| 1,400,738 | 12/21 | Gehr | 111—34 |
| 2,907,015 | 9/59 | Young | 111—34 X |

FOREIGN PATENTS

| | | |
|---|---|---|
| 703,397 | 7/30 | France. |

ABRAHAM G. STONE, *Primary Examiner.*

WILLIAM A. SMITH III, *Examiner.*